United States Patent
Mizikovsky et al.

(10) Patent No.: US 9,225,518 B2
(45) Date of Patent: Dec. 29, 2015

(54) METHOD OF PROVIDING FRESH KEYS FOR MESSAGE AUTHENTICATION

(75) Inventors: Semyon B. Mizikovsky, Morganville, NJ (US); Robert J. Rance, Andover, MA (US)

(73) Assignee: Alcatel Lucent, Boulogne-Billancourt (FR)

(*) Notice: Subject to any disclaimer, the term of this patent is extended or adjusted under 35 U.S.C. 154(b) by 1992 days.

(21) Appl. No.: 11/682,516

(22) Filed: Mar. 6, 2007

(65) Prior Publication Data
US 2008/0137853 A1 Jun. 12, 2008

(51) Int. Cl.
H04K 1/00 (2006.01)
H04L 9/08 (2006.01)
H04L 9/32 (2006.01)

(52) U.S. Cl.
CPC ............ *H04L 9/0836* (2013.01); *H04L 9/0844* (2013.01); *H04L 9/3242* (2013.01); *H04L 2209/80* (2013.01)

(58) Field of Classification Search
CPC ......... H04L 63/08; H04L 63/10; H04L 63/20; H04L 2209/80; H04L 9/0844; H04L 9/3242; H04W 12/06; Y10S 707/99952
USPC ................ 380/247; 455/411; 713/168; 726/4
See application file for complete search history.

(56) References Cited

U.S. PATENT DOCUMENTS

| | | | | |
|---|---|---|---|---|
| 5,745,576 A | * | 4/1998 | Abraham et al. | 705/73 |
| 2002/0059620 A1 | * | 5/2002 | Hoang | 725/87 |
| 2003/0156721 A1 | * | 8/2003 | Widman | 380/277 |
| 2006/0187878 A1 | * | 8/2006 | Calhoun et al. | 370/331 |
| 2007/0076650 A1 | * | 4/2007 | Manjeshwar et al. | 370/328 |
| 2008/0170691 A1 | * | 7/2008 | Chang et al. | 380/270 |

OTHER PUBLICATIONS

Data Encryption Standard (DES) federal information processing standards publication 46-2 Dec. 30, 1993.*
Joseph Migga Kizza, Security in Wireless Networks and Devices, Monday, Dec. 5, 2005, Springer US, p. 463-493.*
Barber et al.(2006). Suggested modfications to IEEE Std 802.16e—2005 and IEEE Std 802.16-2004/Cor Jan. 2005 to support AK Caching Solution. Retrieved from: http://www.ieee802.org/16/maint/contrib/C80216maint-06_014.pdf.*
Johnston (2005). Restructuring of Clause 7 of 802.16e. Retrieved from http://www.ieee802.org/16/tge/contrib/C80216e-05_402r1.pdf.*
Wimax.(2005). Wimax end-to-end network systems architecture: stage 2: architecture tenets, reference model and reference points.*
IEEE (Feb. 2006). Part 16: Air Interface for Fixed and Mobile Broadband Wireless Access Systems. Retrieved from http://ieeexplore.ieee.org/stamp/stamp.jsp?tp=&arnumber=1603394&userType=&tag=1.*

* cited by examiner

*Primary Examiner* — Brian Shaw
(74) *Attorney, Agent, or Firm* — Davidson Sheehan LLP

(57) ABSTRACT

The present invention provides a method of operating a mobile unit in a wireless communication system. Embodiments of the method may include providing access request message(s) including information indicative of a first counter and a message authentication code formed using a first key. The first key is derived from a second key and the first counter. The second key is derived from a third key established for a security session between the mobile unit and an authenticator. The first counter is incremented in response to each access request provided by the mobile unit.

9 Claims, 3 Drawing Sheets

METHOD OF PROVIDING FRESH KEYS FOR MESSAGE AUTHENTICATION

CROSS-REFERENCE TO RELATED APPLICATIONS

This patent application is related to the Provisional Application 60/873,770 filed Dec. 8, 2006 and is related to U.S. application Ser. No. 11/352,960 entitled "Method of Providing Fresh Keys for Message Authentication", filed Feb. 13, 2006, in the name of the inventors Semyon B. Mizikovsky and Robert J. Rance.

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of geographic areas that are often referred to as cells. Mobile units located in each cell may access the wireless communications system by establishing a wireless communication link, often referred to as an air interface, with a base station associated with the cell. The mobile units may include devices such as mobile telephones, personal data assistants, smart phones, Global Positioning System devices, wireless network interface cards, desktop or laptop computers, and the like. Communication between the mobile unit and the base station may be authenticated and/or secured using one or more authentication protocols.

Mobile units having an established security association with a first base station may roam to another cell served by a second base station. The second base station and the roaming mobile unit may therefore mutually authenticate and/or validate each other to verify the legitimacy of the second base station and the mobile unit before beginning secure transmissions. For example, in a WiMAX wireless communication system such as defined by the IEEE 802.16e standards, the mobile unit may validate a message authentication code (e.g., a cipher-based message authentication code, CMAC, and/or a hashed message authentication code, HMAC) that is generated by the second base station and attached to a downlink message provided to the mobile unit. The base station also validates a message authentication code provided by the mobile unit in an uplink message. The message authentication codes are generated using secret keys derived from the secret key AK.

Authentication schemes that use message authentication codes to validate roaming mobile units to base stations may be vulnerable to replay (or repeat) attacks. In a replay attack, an illegitimate mobile unit or base station intercepts a valid message authentication code in an uplink or downlink message from a legitimate mobile unit or base station. The illegitimate mobile unit or base station then transmits a copy of the message with valid message authentication code to a base station or mobile unit, which may then initiate fraudulent communication with the illegitimate mobile unit or base station based on the replayed copy of the message with valid message authentication code.

Replay attacks may be prevented by including a counter (or crypto-sync) in the computation of the message authentication code. For example, the IEEE 802.16e standards define two CMAC Packet Number Counters, which are four byte sequential counters that may be incremented in the context of an uplink message by the mobile unit and in the context of a downlink message by the base station. The downlink counter CMAC_PN_D is maintained by the base station and incremented for every downlink message transmitted to the mobile unit. The uplink counter CMAC_PN_U is maintained by the mobile unit and incremented for every uplink message transmitted to the base station. The receiving side may then verify that the value of the received counter has not been repeated. For example, the receiving side may insure that the received counter is larger than the previous value of the counter received from the transmitting side.

Conventional authentication schemes, such as the WiMAX wireless communication system defined by the IEEE 802.16e standards, associate the uplink and a downlink counters with the secret key AK. Since the secret key AK is unique to each security association between a base station and a mobile unit, the base stations and mobile units in the wireless communication system must maintain a record of the secret key, the current value of the uplink counter, the current value of the downlink counter, and other AK-related parameters. This combination is typically referred to as the AK context. To prevent replay attacks, each base station must maintain a record of the AK context for each mobile unit that ever had a security association with this base station, even after a mobile unit exited said base station, in anticipation that it may return and continue communication. Similarly, each mobile unit must maintain a record of the AK context for every base station that it ever had a security association with.

Caching of the AK context at every mobile unit and base station is inefficient and consumes a large amount of storage. Caching of the AK context at every mobile unit and base station may also create a security vulnerability. For example, if the size of the caching storage element is exceeded, the oldest AK context may be purged to allow room for a new AK context. Once the old AK context is lost, the receiving site cannot validate the freshness of the received counters and repeat or replay attacks may become possible.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for operating a mobile unit in a wireless communication system. Embodiments of the method may include providing access request message(s) including information indicative of a first counter and a message authentication code formed using a first key. The first key is derived from a second key and the first counter. The second key is derived from a third key established for a security session between the mobile unit and an authenticator. The first counter is incremented in response to each access request provided by the mobile unit.

In another embodiment of the present invention, a method is provided for operating a base station in a wireless communication system. Embodiments of the method may include receiving, from a mobile unit, at least one access request message including information indicative of a first counter and a message authentication code formed using a first key. The first key is derived from a second key and the first counter, and the second key is derived from a third key established for a security session between the mobile unit and an authenticator. The method may also include determining whether to grant access to the mobile unit based on the message authentication code and the value of the first counter. The method may further includes providing a message indicating whether access is granted to the mobile unit in response to determining whether to grant access to the mobile unit.

In yet another embodiment of the present invention, a method is provided for operating an authenticator in a wireless communication system. Embodiments of the method may include providing, to at least one base station, information indicative of a first counter. The first counter is initialized in response to establishment of a security session between a mobile unit and the authenticator, and the first counter is incremented in response to at least one base station granting access to the mobile unit.

BRIEF DESCRIPTION OF THE DRAWINGS

The invention may be understood by reference to the following description taken in conjunction with the accompanying drawings, in which like reference numerals identify like elements, and in which.

Figure 1:
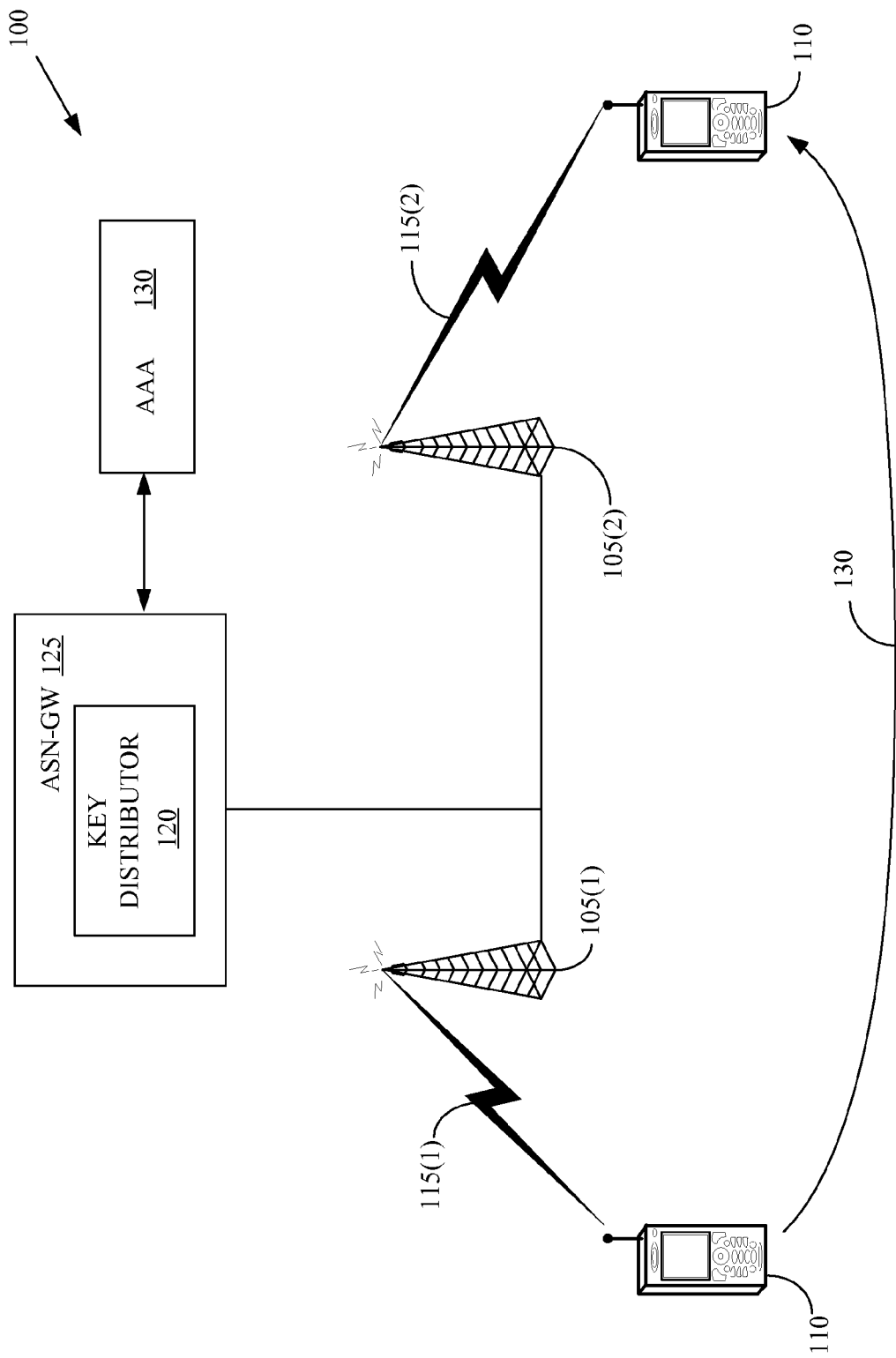
FIG. 1 conceptually illustrates one exemplary embodiment of a wireless communications system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communications system 100. In the illustrated embodiment, the wireless communications system 100 may provide wireless connectivity according to third generation wireless communication protocols such as described in the IEEE 802.16 broadband wireless system supported by network procedures specified by the WiMAX Forum. However, persons of ordinary skill in the art should appreciate that the present invention is not limited to a wireless communications system 100 that operates according to the IEEE 802.16 system. In alternative embodiment, any wireless communication protocol may be used to provide wireless connectivity. Furthermore, in some embodiments, the wireless communications system 100 may include, or be connected to, one or more wired communication systems.

The wireless communications system 100 shown in FIG. 1 may include one or more base stations 105(1-2). In the interest of clarity, the indices (1-2) will hereinafter be dropped when the base stations 105 are being referred to collectively. However, the indices (1-2) may be used when referring to the base stations 105 individually or to a subset of the base stations 105. The same convention will be used with regard to other indices that distinguish between components that share an identifying numeral. Although two base stations 105 are shown in FIG. 1, persons of ordinary skill in the art should appreciate that the present invention is not limited to wireless communication systems 100 including only two base stations 105. In alternative embodiments, any number of base stations 105 may be deployed in the wireless communication system 100. In the illustrated embodiment, the base stations 105 may provide wireless connectivity using orthogonal frequency division multiplexing (OFDM/OFDMA) techniques. However, persons of ordinary skill in the art should appreciate that the present invention is not limited to the use of orthogonal frequency division multiplexing techniques.

The base stations 105 may provide wireless connectivity to a mobile unit 110. In the interest of clarity, a single mobile unit 110 is depicted in FIG. 1. However, persons of ordinary skill in the art having benefit of the present disclosure should appreciate that the present invention is not limited to a single mobile unit 110 and in alternative embodiments any number of mobile units 110 may be deployed in the wireless communication system 100. The mobile unit 110 may be any type of mobile unit including, but not limited to, a cellular telephone, a personal data assistant, and a laptop computer. However, persons of ordinary skill in the art having benefit of the present disclosure should appreciate that the present invention is not limited to these particular examples of mobile units 110 and in alternative embodiments other types of mobile units 110 may also be used. Persons of ordinary skill in the art should also appreciate that the mobile units 110 may be referred to using other terms such as mobile shell, user equipment, user terminal, access terminal, subscriber station, subscriber terminal, and the like.

In the illustrated embodiment, the mobile unit 110 has an established security association with the base station 105(1) that permits secure transmissions over an air interface 115(1). For example, the security association may be formed according to an extensible authentication protocol (EAP), which is an authentication protocol that provides an infrastructure to enables clients to authenticate with a central authentication server. During the initial authentication, an EAP authentication may be executed between the mobile unit 110, a key distributor 120 implemented in an Access Serving Network Gateway (ASN-GW) 125, and Authentication, Authorization, and Accounting server (AAA) 130 that handles various functions associated with authenticating and authorizing wireless communications, as well as providing billing services associated with a wireless communications. Techniques for performing the initial EAP authentication are known in the art and in the interest of clarity will not be discussed herein.

If the initial EAP authentication is successful, a Master Session Key (MSK) is derived by the AAA 130 and the mobile unit 110. The MSK is sent to the key distributor 120 by the AAA 130. The mobile unit 110 and the key distributor 120 may then derive a Pairwise Master Key (PMK) using the MSK. The PMK signifies the security association between the mobile unit 110 and the Access Serving Network Gateway 125 and/or the key distributor 120. Then, the key distributor 120 and the mobile unit 110 may derive an Authorization Key (AK) for each base station 105 from the PMK. The AK may then be sent to the corresponding base station 105 by the key distributor 120. Messages transmitted over the air interface 115(1) may include, or be formed using, a message authentication code, such as a CMAC and/or an HMAC. The AK generated by the key distributor 120 and the mobile unit 110 may be the source of secrecy for generating the CMAC and/or the HMAC. For example, the mobile unit 110 and the base stations 105 can generate keys (which are referred to herein as CMAC_KEY_UP and CMAC_KEY_DN for the keys used on the uplink and downlink, respectively) from the AK. These keys may then be used to generate the CMAC/HMAC that is attached to messages transmitted over the air interface 115. The messages may be authenticated and the integrity of messages may be checked by validating the CMAC/HMAC.

Fresh values of the access keys, such as the CMAC_KEY_UP and/or CMAC_KEY_DN keys, may be generated each time the mobile unit 110 requests access to one of the base stations 105. In one embodiment, the fresh access key values are computed regardless whether or not the mobile unit 110 has been communicating with this base station 105 during current session (i.e. with the current AK). To generate the fresh access keys, the mobile unit 110 and the AAA 130 maintain a single counter that is incremented for each access associated with a current security association. For example, the mobile unit 110 may roam from its current geographic area, or cell, into another cell that is served by the base station 105(2), as indicated by the arrow 130. The access counter may then be incremented when the mobile unit 110 is handed off to the target base station 105(2). The mobile unit 110 and/or the base stations 105 may use the access counters to compute the fresh value of the access keys for every access.

In one embodiment, the mobile units 110 also maintain a counter (or crypto-sync) that may be incremented immediately prior to transmitting each message over the air interface 115(1). For example, the IEEE 802.16e standards define an uplink CMAC Packet Number Counter, CMAC_PN_U, which is a four byte sequential counter that may be incremented in the context of an uplink message by the mobile unit 110. The mobile unit 110 uses the counter in the computation of the message authentication code. In one embodiment, the crypto-sync CMAC_PN_U may be reset to zero for each access and incremented prior to transmitting each message via the access to base station 105. Thus, the combination of {CMAC_KEY_UP, CMAC_PN_U} remains unique for each message transmitted via the accessed base station 105. The base station 105(1) may include a register that stores the last received and authenticated value of the CMAC_PN_U counter. Thus, when the base station 105(1) receives a message from the mobile unit 110, the base station 105(1) may verify that the value of the received CMAC_PN_U counter has not been repeated, e.g., the base station 105(1) may verify that the value of the received CMAC_PN_U counter is larger than the value stored in the register.

The base station 105(1) may also maintain a counter (or crypto-sync) that may be incremented immediately prior to transmitting each message over the air interface 115(1) and may be used in the computation of the message authentication code. For example, the IEEE 802.16e standards define a downlink CMAC Packet Number Counter, CMAC_PN_D, which is a four byte sequential counter that may be incremented in the context of a downlink message by the base station 105(1). In one embodiment, the crypto-sync CMAC_PN_D may be reset to zero for each access and incremented prior to transmitting each message from the accessed base station 105. Thus, the combination of {CMAC_K-

EY_DN, CMAC_PN_D} remains unique for each message transmitted from the access to base station 105. The mobile unit 110 may include a register that stores the last received and authenticated value of the counter. Thus, when the mobile unit 110 receives a message from the base station 105(1), the mobile unit 110 may verify that the value of the received counter has not been repeated, e.g., the mobile unit 110 may verify that the value of the received counter is larger than the value stored in the register.

Since the access keys, such as the CMAC_KEY_UP and/or CMAC_KEY_DN keys, are freshly generated for each access, the base stations 105 do not need to maintain (or cache) a record of the AK context for each mobile unit 110 that ever had a security association with the base station 105. The mobile unit 110 also does not need to maintain (or cache) a record of the AK context for every base station 105 that it ever had a security association with. Instead, the base stations 105 and/or the mobile units 110 may simply store and/or retrieve the current values of the access counter, the uplink counter, and the downlink counter for the currently accessed base station. The memory requirements for storing the uplink and/or downlink counters, as well as the uplink and/or downlink registers, are minimal and therefore are unlikely to be lost due to purging. Thus, the relatively simple addition of a new information element TLV (Type-Length-Value) to an access message and a corresponding change to the CMAC digest tuple calculation removes the onerous memory burden of storing all the AK context information associated with a large number of combinations of mobile units 110 and base stations 105. Embodiments of the techniques described herein may also preserve protection from replay attacks and permit the employment of more common designs for network Authenticators 130.

Figure 2:
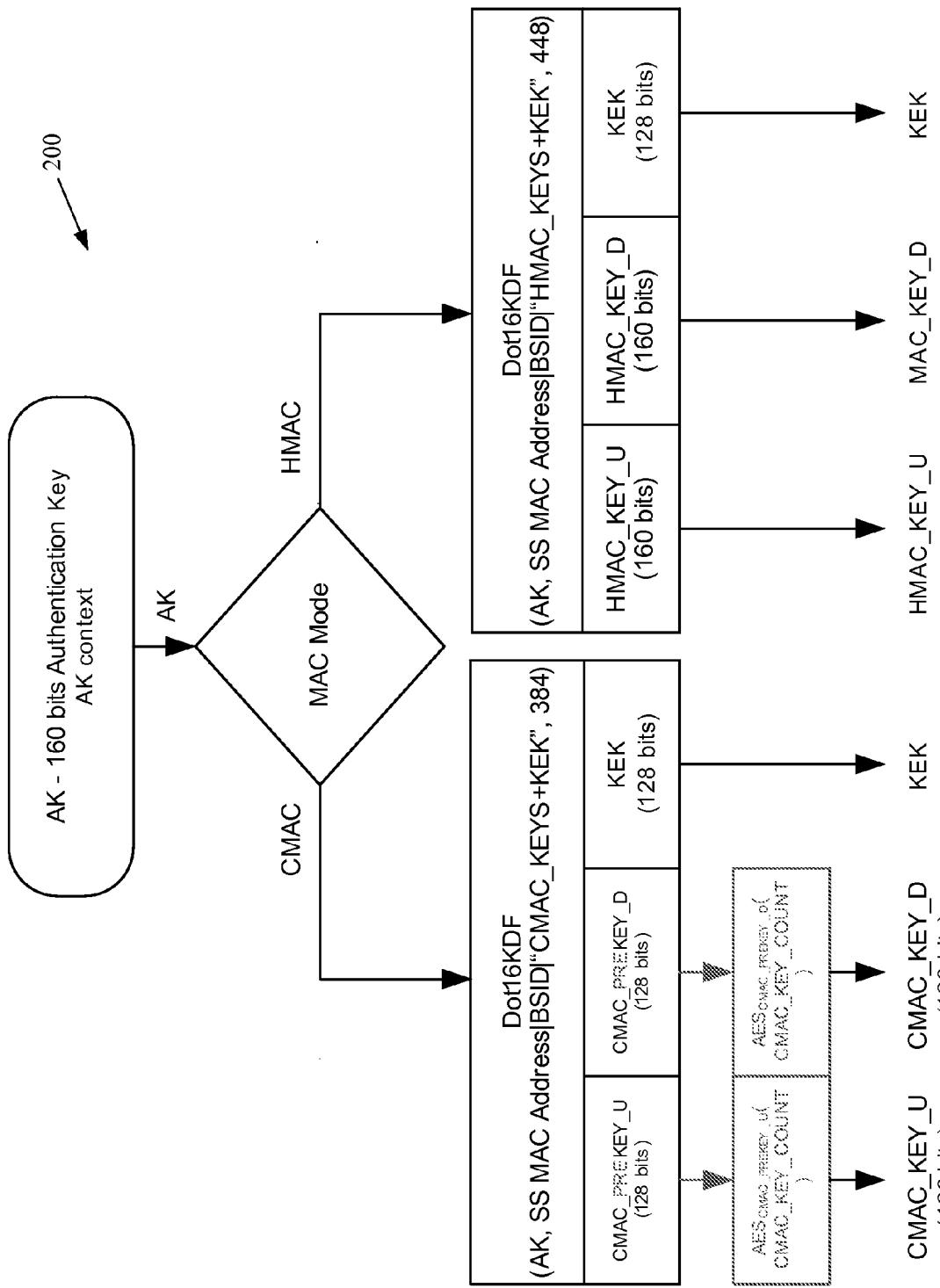
FIG. 2 conceptually illustrates one exemplary embodiment of a key hierarchy, in accordance with the present invention.

FIG. 2 conceptually illustrates one exemplary embodiment of a key hierarchy 200. In the illustrated embodiment, message authentication code (MAC) keys are used to sign management messages in order to validate the authenticity of these messages. A 160-bit Authentication Key (AK) and the associated context is generated for a security association, e.g., between a mobile unit and a network authenticator. The AK and the associated context may be used to generate message authentication code keys such as the HMAC keys that are generated in the HMAC mode and the CMAC keys that are generated in the CMAC mode. The CMAC mode of generating a MAC is negotiated at SS Basic Capabilities negotiation between the Subscriber/Mobile Station and Serving Network. There is a different key for UL and DL messages. In general, the message authentication keys used to generate the CMAC value are derived from the AK.

In the illustrated embodiment, the keys used for CMAC key and for KEK (Key-Encryption Key) are generated as follows:

$$CMAC\_PREKEY\_U|CMAC\_PREKEY\_D|KEK \Leftarrow\\ Dot16KDF(AK, SS\ MAC\\ Address|BSID|\text{"CMAC\_KEYS+KEK"}, 384)$$

$$CMAC\_KEY\_U \Leftarrow AES_{CMAC\_PREKEY\_U}(CMAC\_KEY\_COUNT)$$

$$CMAC\_KEY\_D \Leftarrow AES_{CMAC\_PREKEY\_D}(CMAC\_KEY\_COUNT)$$

Specifically, the preprocessed value of a CMAC_PREKEY_* is treated as the Cipher Key of the Advanced Encryption Standard (AES) algorithm AES128 (FIPS197). The CMAC_KEY_COUNT is treated as the Input Block Plain Text of this algorithm. The AES128 algorithm is executed once. The Output Block Cipher Text of this algorithm is treated as the resulting CMAC_KEY_*. When CMAC_KEY_COUNT is used as an input of AES128 algorithm, 112 zero bits are pre-padded before the 16-bit CMAC_KEY_COUNT where the CMAC_KEY_COUNT is regarded as most-significant-bit first order. The AES input is also defined as most-significant-bit first order. In alternative embodiments, the CMAC_KEY_* could be formed using a simpler generator, e.g., an XOR of the CMAC_PREKEY_* and the CMAC_KEY_COUNT, addition of these values, multiplication of these values, and the like. However, the simpler generators may be more vulnerable. For example, in the case of the XOR generator, if any weaknesses in the MAC function and the CMAC_KEY_* (or some parts of the CMAC_KEY_*) are revealed, then the CMAC_PREKEY_* or parts of the CMAC_PREKEY_* may also be revealed. In contrast, when the AES function is used, nothing about the CMAC_PREKEY_* is revealed even if all of the CMAC_KEY_* is revealed.

As discussed above, the CMAC_KEY_COUNT may be incremented for each mobile unit access, which results in the CMAC_KEY_* being fresh for each access. For example, instead of computing a stale CMAC_KEY_U and CMAC_KEY_D from the AK, as is done in conventional practice, the intermediary stale values of CMAC_PREKEY_U and CMAC_PREKEY_D are computed, and then for every access the fresh values of CMAC_KEY_U and CMAC_KEY_D are generated with the contribution of the current CMAC_KEY_COUNT counter.

Referring back to FIG. 1, the access counter may be a 16-bit counter that is referred to herein as CMAC_KEY_COUNT. Values of this counter are maintained by the mobile unit 110, the base station 105 and the authenticator 130. In the present discussion, the CMAC_KEY_COUNT may also be denoted as N. The value of this count maintained by the mobile unit 110 is denoted as $CMAC\_KEY\_COUNT_M$ or X, the count value maintained by the base station 105 is denoted as $CMAC\_KEY\_COUNT_B$ or Y, and the value maintained by the authenticator 130 is denoted as $CMAC\_KEY\_COUNT_N$ or Z. In one embodiment, the mobile unit 110 may be required to invoke the CMAC key post-processing feature described herein if the base station 105 indicates that this feature is supported.

In the illustrated embodiment, the mobile unit 110 is configured to reset the $CMAC\_KEY\_COUNT_M$ (X) to zero upon successful completion of the PMKv2 Authentication or Re-authentication procedure and/or establishment of a new PMK. For example, this reset may occur upon reception of the SA-TEK Challenge message. The count of zero can initially be used to generate the CMAC_KEY_* keys that may be used authenticate the SA-TEK Challenge message. The $CMAC\_KEY\_COUNT_B$ (Y) and the $CMAC\_KEY\_COUNT_N$ (Z) in the serving base station 105 and authenticator 130 may also be set to zero and one, respectively, upon successful completion of the PMKv2 Authentication or Re-authentication procedure and/or establishment of a new PMK. These resets may also occur immediately prior to the transmission of the SA-TEK Challenge message. For each subsequent authenticated access to the new serving base station 105, e.g. whenever the mobile unit 110 sends an initial RNG-REQ message to this base station 105, the mobile unit 110 may increment the CMAC_KEY_COUNT counter (X++) before the mobile unit 110 generates the CMAC Digest for the RNG-REQ message. The mobile unit 110 may also send the value of the $CMAC\_KEY\_COUNT_M$ (X) counter in a CMAC_KEY_COUNT TLV included in the RNG-REQ message.

In one embodiment, the mobile unit 110 may enter a locked mode when it elects to access the network. For example, the mobile unit 110 may enter a CMAC_Key_Lock state in which the CMAC_KEY_COUNT cannot be changed. Any RNG-REQ messages sent to other potential target base stations 105 while the mobile unit 110 is in the CMAC_Key_Lock state therefore use the same CMAC_KEY_COUNT. While in the Key Lock state, the mobile unit 110 needs to cache the values of the CMAC_PN_* counters corresponding to each potential target base station 105 to which it had sent an RNG-REQ message. The mobile unit 110 may enter an unlocked mode when it is not attempting to access a different base station 105. For example, when the mobile unit 110 decides that it is either connected to the target base station 105, or declines handover and remains connected to its current serving base station 105, the mobile unit 110 may enter the CMAC_Key_Unlock state.

The value of the $CMAC\_KEY\_COUNT_N$ (Z) is maintained by the authenticator 130, such as an Anchor Authenticator—Key Distributor (KD) located in the network. The authenticator 130 may maintain the $CMAC\_KEY\_COUNT_N$ for every mobile unit 110 as the part of its security context, called the AK Context, and associated with the PMK. When the authenticator 130 for the mobile unit 110 is relocated, and the associated AK context for the mobile unit 110 is deleted from the authenticator 130, the value of $CMAC\_KEY\_COUNT_N$ is also deleted. Upon successful completion of the PMKv2 Authentication or Re-authentication, and creation of a new PMK, the authenticator 130 may set the $CMAC\_KEY\_COUNT_N$ for the mobile unit to 1. In particular, setting the count to 1 may occur when authenticator 130 receives indication of the successful completion of EAP-based authentication. Upon receiving the AK Request or Context Request message from the Key Receiver, the authenticator 130 may return the current value of the $CMAC\_KEY\_COUNT_N$ in the AK Transfer or Context Report message, respectively.

The base station 105 may also maintain an AK context associated with the mobile unit 110. The AK context maintained by the base station 105 includes the value of $CMAC\_KEY\_COUNT_B$ (Y), which may be locally maintained or obtained from the authenticator 130. In one embodiment, base stations 105 may request the AK context from the authenticator 130 when the mobile unit 110 enters the base station 105. Alternatively, the authenticator 130 may prepopulate the AK context in base stations 105 in the active set as the part of handoff preparation. The base station 110 may retain the AK context for a selected period of time if the mobile unit 105 is expected to return to or re-enter this base station. However, the AK context for an inactive mobile unit 110 may also be deleted from the base station 105 soon after the mobile unit 110 has exited the base station 105. Reducing the storage times for AK context associated with inactive mobile units 110 may improve overall security of the system 100 by reducing the likelihood that the stored contexts may be purged and subjected to a replay attack.

Figure 3:
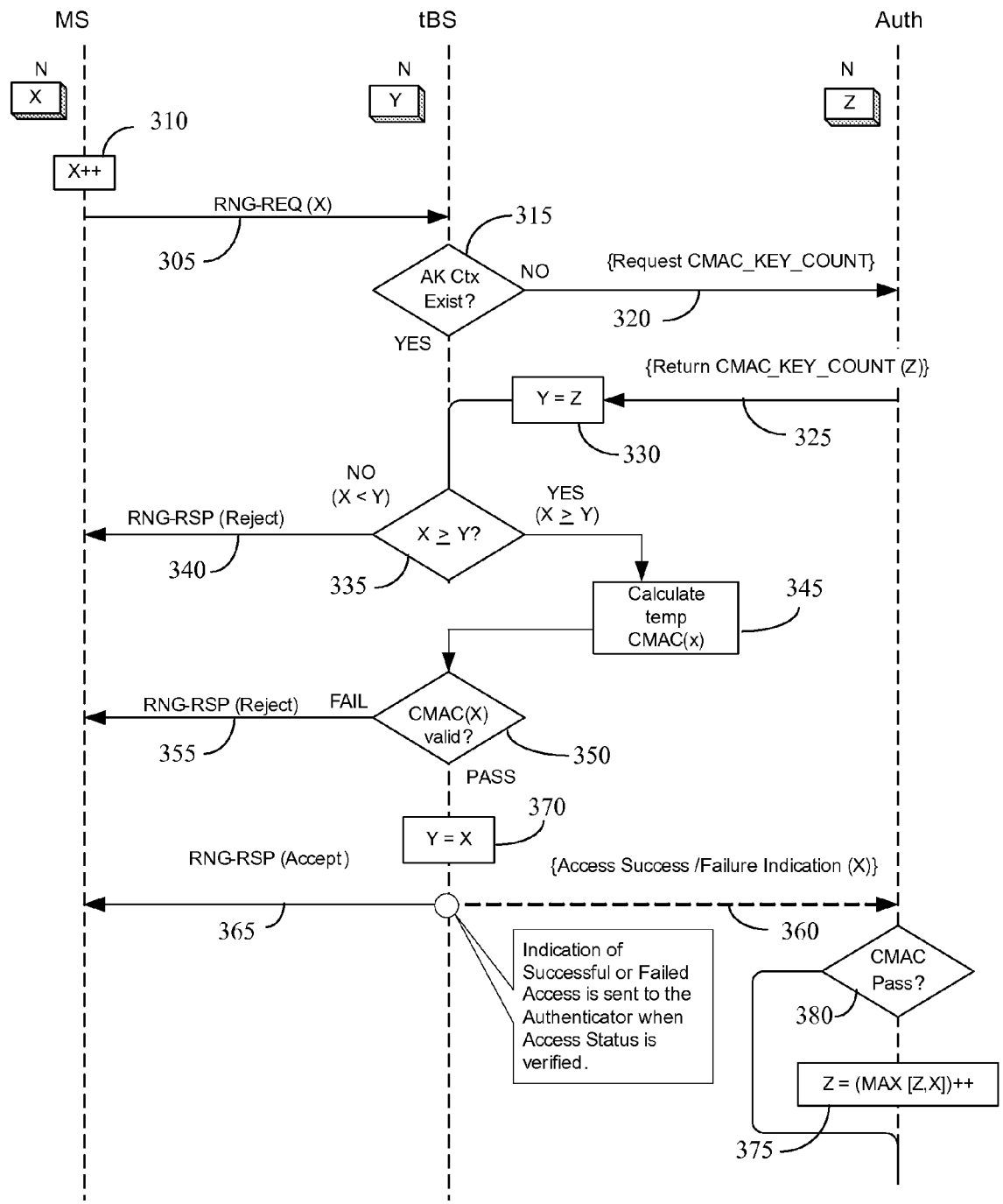
FIG. 3 conceptually illustrates one exemplary embodiment of a method of maintaining a counter used to generate fresh access keys, in accordance with the present invention.

FIG. 3 conceptually illustrates one exemplary embodiment of a method 300 of maintaining a counter used to generate fresh access keys. This section shows a process flowchart for access requests including requests for reentry, handover, Secure Location Update, and the like. In the illustrated embodiment, a mobile unit (MS) sends (at 305) an initial RNG-REQ message to a base station (BS). The mobile unit increments (at 310) the CMAC_KEY_COUNT counter (X++) before generating the CMAC Digest for the RNG-REQ message so that the CMAC digest formed using the incremented value of the counter in the attached to the RNG-REQ message. The base station determines (at 315) whether a copy of the AK context associated with the mobile unit is present on the base station. If the base station does not have a copy of the AK context and/or the access counter associated with the mobile unit, base station may request (at 320) and receive (at 325) a copy of the access counter from the authenticator (AUTH). For example, if the base station does not possess the current value of $CMAC\_KEY\_COUNT_B$ (Y), as may be the case in an uncontrolled handoff, the base station may request (at 320) and receive (at 325) it from the Anchor Authenticator/Key Distributor. If the base station obtains (at 325) the AK Context including the $CMAC\_KEY\_COUNT_N$ (Z) from the key distributor, the base station may set (at 330) the value of $CMAC\_KEY\_COUNT_B = CMAC\_KEY\_COUNT_N$ (Y=Z).

The base station may then compare (at 335) the received count value $CMAC\_KEY\_COUNT_M$ with the $CMAC\_KEY\_COUNT_B$ (X<>Y) upon receiving the RNG-REQ message from the mobile unit containing the CMAC_KEY_COUNT TLV. If $CMAC\_KEY\_COUNT_M < CMAC\_KEY\_COUNT_B$ and the RNG-REQ message is received as a part of reentry or handoff, the base station may send (at 340) a RNG-RSP message rejecting the access request and indicating that mobile unit should conduct full re-authentication. If $CMAC\_KEY\_COUNT_M \geq CMAC\_KEY\_COUNT_B$, the base station may use the $CMAC\_KEY\_COUNT_M$ to compute (at 345) a temporary value of $CMAC\_KEY\_U_T$, and use the $CMAC\_KEY\_U_T$ to validate (at 350) the CMAC digest present in the RNG-REQ message. If the CMAC digest is not valid, and the RNG-REQ message is received as a part of reentry, handoff, or Secure Location Update, the base station sends (at 355) the RNG-RSP message rejecting the access request and indicating that mobile unit should conduct a full re-authentication.

Otherwise, if the CMAC digest is valid, and $CMAC\_KEY\_COUNT_M = CMAC\_KEY\_COUNT_B$, the base station sends (at 360) an R6 Context Confirm message to the authenticator and sends (at 365) a RNG-RSP message to the mobile unit allowing legitimate access. If CMAC digest is valid, and $CMAC\_KEY\_COUNT_M > CMAC\_KEY\_COUNT_B$, the base station can include the $CMAC\_KEY\_COUNT_M$ in the R6 Context Confirm message sent (at 360) to the Anchor Authenticator and send (at 365) the RNG-RSP message to the mobile unit allowing legitimate access. The base station may also set (at 370) the value of $CMAC\_KEY\_COUNT_B = CMAC\_KEY\_COUNT_M$. Upon receiving the Context Confirm message containing the $CMAC\_KEY\_COUNT_M$, the authenticator can increment the $CMAC\_KEY\_COUNT_M$ and compare it to the locally maintained value of $CMAC\_KEY\_COUNT_N$. The authenticator may also select (at 375) the largest of the two as the valid value of the count, such that $$CMAC\_KEY\_COUNT_N = MAX(CMAC\_KEY\_COUNT_N,$$

$$CMAC\_KEY\_COUNT_M\!+\!+)$$

in other words $$Z = MAX(Z, X\!+\!+)$$

The authenticator may then retain the incremented value of the $CMAC\_KEY\_COUNT_N$. In one embodiment, the authenticator may also compute and verify (at 380) the value of the CMAC message using the locally stored value of $CMAC\_KEY\_COUNT_N$ prior to incrementing this value. If the CMAC message is validated (at 380), indicating that the locally stored value of $CMAC\_KEY\_COUNT_N$ corresponds to the value received in the Context Confirm message, and it may not be necessary to perform the update procedure described above on the locally stored value of $CMAC\_KEY\_COUNT_N$.

In some embodiment, not all of the steps of method 300 may be performed. For example, if handover cancellation occurs before the Network Re-Entry Phase, no messages are exchanged between the mobile unit and the target base station. Thus, no CMAC_KEY_* keys based on the incremented count have been used to generate messages. Therefore, from a security perspective, it is legitimate to leave the counters in the mobile unit, base station, and authenticator un-incremented after cancellation. Operationally, none of the steps shown in method 300 occurs, which means that none of the access counters are incremented.

Another case to be considered here is what happens if the Network Re-Entry Phase proceeds partially so that the mobile unit sends the RNG-REQ message but this message is not received by the target base station. In this case, the mobile unit's CMAC_KEY_COUNT is incremented to (N+1), but the authenticator's count remains un-incremented at (N+1). The mobile unit would then presumably resume communications with the serving base station and it can just continue its CMAC_PN_* counters where they left off and continue using the same CMAC_KEY_* keys that had been derived from the prior counter value of N, even though its counter has been incremented. However, during the next (successful) reentry, handoff, or secure location update, the mobile unit may again increment its counter, this time to (N+2), but the target base station during the handoff preparation phase may have its counter set at (N+1) by the authenticator. When the target base station receives the RNG-REQ message, it will detect the out-of-sync condition and set its counter to the value contained in that message, namely (N+2). The base station may then inform the authenticator of this new value and the authenticator may re-sync accordingly. Thus, there is no negative impact, delay or otherwise, from this particular type of failure.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method, comprising:
providing, from a mobile unit, at least one access request message including information indicative of a message authentication code formed using a first key, the first key being derived by the mobile unit from a second key and a first counter, the second key being derived from a third key established for a security session between the mobile unit and an authenticator, wherein the first counter is only incremented in response to an access request message provided by the mobile unit for a hand-off of the mobile unit;
initiating, in response to providing said at least one access request message, a key lock mode in which the counter cannot be changed; and
exiting the key lock mode in response to establishing a connection with at least one base station based on said at least one access request message.

2. The method of claim 1, comprising deriving the first key using a permutation of the first counter.

3. The method of claim 2, comprising using a block cipher to execute the permutation.

4. The method of claim 3, comprising using an Advanced Encryption Standard (AES) algorithm as the block cipher.

5. The method of claim 3 comprising using the second key as the cipher key for a block cipher algorithm and using the first counter as Input Block Plain Text for the block cipher algorithm.

6. The method of claim 1, comprising initializing the first counter in response to establishing a security session between the mobile unit and the authenticator.

7. The method of claim 1, comprising incrementing the first counter prior to forming the first key and prior to providing said at least one access request message.

8. The method of claim 1, wherein providing the access request message comprises providing information indicative of the first counter.

9. The method of claim 1, comprising:
receiving, from at least one base station, a message indicating that access has been granted in response to said at least one base station validating the message authentication code and in response to said at least one base station confirming that the first counter is larger than a second counter maintained by said at least one base station; and
establishing a connection with said at least one base station in response to receiving the message.

* * * * *